United States Patent
Pflanz

[19]

[11] Patent Number: 6,100,600
[45] Date of Patent: Aug. 8, 2000

[54] MARITIME POWER PLANT SYSTEM WITH PROCESSES FOR PRODUCING, STORING AND CONSUMING REGENERATIVE ENERGY

[76] Inventor: Tassilo Pflanz, Lutestr. 8, 80887 München, Germany

[21] Appl. No.: 09/164,082

[22] Filed: Sep. 30, 1998

[51] Int. Cl.[7] .............................. F03D 9/00; F03B 13/00
[52] U.S. Cl. .............................................. 290/54; 290/4 R
[58] Field of Search ................................... 290/4 R, 4 A, 290/4 D, 42, 43, 44, 54, 53, 55

[56] References Cited

FOREIGN PATENT DOCUMENTS

| | | |
|---|---|---|
| 2514447 | 10/1976 | Germany . |
| 2520044 | 11/1976 | Germany . |
| 2752892 | 4/1979 | Germany . |
| 3332810A1 | 3/1985 | Germany . |
| 3622119A1 | 1/1988 | Germany . |
| 3622285A1 | 1/1988 | Germany . |
| 3627130A1 | 2/1988 | Germany . |
| 3634102A1 | 4/1988 | Germany . |
| 3704280A1 | 8/1988 | Germany . |
| 3808536A1 | 9/1989 | Germany . |
| 7017684C2 | 12/1991 | Germany . |
| 4137569A1 | 5/1992 | Germany . |
| 4310843A1 | 10/1994 | Germany . |
| 4339824 | 5/1995 | Germany . |
| 19502953 | 12/1995 | Germany . |

OTHER PUBLICATIONS

"World Energy Supply",; 1982; Walter de Gruyter.
Entwicklung. Simulation. Bau und Erprobung . . . der Umkehrosmose 1980;Thomas Peters.
Ostbayerisches Technologie Transfer Institute e.V (OTTI) Regensburg; 1994.
"Renewable Energy From The Ocean"; 1994; Avery et al.
"Dewek '96"; Oct. 1996; Tagungsband.
"Windenergie"; Jens–Peter Molly; pp. 69–85.
"Windenergienutzung auf den Meeren"; 1988; Felix von König.
"Wasserstoff als Energieträger"; 1986; Winter et al; pp. 310–325.

*Primary Examiner*—Nicholas Ponomarenko
*Attorney, Agent, or Firm*—Robert W. Becker & Associates

[57] ABSTRACT

A maritime power plant system for producing, storing and consuming regenerative energy has a support structure on which energy producing devices for producing a continuous supply of energy by at least two different methods from regenerative energy sources are provided. The regenerative energy sources are ocean water, ocean waves, wind, and solar radiation. At least one industrial production facility is also connected to the support structure. A submarine reverse osmosis device is provided.

42 Claims, 5 Drawing Sheets

MARITIME POWER PLANT SYSTEM WITH PROCESSES FOR PRODUCING, STORING AND CONSUMING REGENERATIVE ENERGY

BACKGROUND OF THE INVENTION

The present invention relates to a maritime power plant system with processes for producing, storing and consuming regenerative energies whereby the power plant system may comprise an individual power plant or may be a network of power plants, whereby the power plant has a common support structure for the devices producing energy and for the devices carrying out other processes.

For using regenerative energy sources, different methods are known. The well known methods include solar energy conversion by photovoltaic tag cells and by thermal collectors. It is also known to employ mirror systems in combination with a steam generator. Also, devices are known which collect hot air with the aid of foils and guide it into the chimney of a thermal uplift power plant.

The kinetic energy of wind is also often used for producing electricity. The use of ocean waves and ocean thermal energy for powering power plants is known to a lesser extent even though a very large energy source, i.e., the ocean, could potentially be used to great advantage.

In the following, an exemplary account of different concepts for generating power by using regenerative energy and the problems correlated therewith will be given.

Photovoltaic devices for hydrogen production in desert areas have been suggested for the use of hydrogen as an energy source by C. -J. Winter and J. Nitsch, 1986. Such devices are combined with hydrogen production by plants at the coast for producing potable water. For electrolysis, the water is pumped through miles of pipelines with great energy expenditure into the desert areas. The hydrogen and oxygen are then conveyed through pipelines back to the costal areas and then farther to Europe. This concept has the disadvantage that the partial processes of the hydrogen production are separated by many miles, and the required materials are brought together with great transmission losses.

Available fresh water reservoirs in desert areas at great depth (ancient non-refillable fresh water reservoir) provide the last reserves for humankind. These water reservoirs are not connected to the circulation of water within the time frame of human consumption and should therefore not be used for hydrogen production in connection with photovoltaic cells.

Large wind-driven power plants with many rotors have been suggested to be operated on the ocean since the 1930's and are known, for example, from the 40 MW Off-Shore Project of Honnef, 1932, and the Off-Shore Project according to Heronemus in the Gulf of Maine, 1972. This is disclosed in the publication Großkraft Wind, Felix von König, 1988. These concepts, however, have not been further explored and have never been realized.

However, further developments in some respects have been undertaken. For example, a number of different rotor types has been developed. For example, there are single and multiple vane rotors with horizontal and vertical axes. Concentration systems according to the principal of turbulence coils (BERWIAN) or mantle turbines and quasi mantle turbines (tip-vanes) have been designed in an attempt to increase the efficiency of the wind power plants when using smaller size rotors. There are also promising systems such as the Darieus rotor, Flettner rotor and Savonius rotor with which energy can be produced without being dependent on the wind direction. A very interesting type is the so-called Yen turbulence tower, also called the tornado tower, which is disclosed in Windenergie, Jens-Peter Molly, 1990.

In order to increase the efficiency of individual rotor devices, a plurality of such devices is combined in wind parks. For a minimal spacing between the rotors, large surface areas are still required. The concept of wind parks, however, does not find general acceptance by the public because such wind parks are considered an eyesore. The increasing resistance of citizens is directed toward wind park construction sites consuming large surface areas which, in the subjective opinion of residents not involved with the wind park, destroy the landscape and thus reduce the recreational value of the land.

Accordingly, multi rotor concepts have been reintroduced, for example, evidenced by Tagungsband der 3. Deutschen Windenergie-Konferenz Okt. 1996, P. 427, with the goal to optimize the use of the available surface areas. Multi rotor devices require a large support structure with corresponding support problems in order to be able to follow the wind direction. These problems can be avoided by employing vertical axis rotors which operate independent of the wind direction. However, these devices also require a large space. Because of the minimal energy density of free air currents, in general, a large surface area for such wind-powered power plants is required in order to provide for an economic energy output. Also, large spacing to traffic channels such as railways and interstates, to residential areas and nature preserves must be provided. A further limitation results from the density of domestic flight corridors, which must not be obstructed by very tall building structures that are taller than 200 meters.

Another form of regenerative energy is the wave movement of the ocean. Power plants based on ocean waves as disclosed in Wave Energy, A Design Challenge, R. Shaw, 1982, fall into three categories:

1. Buoy types which use the lifting force of the waves by employing a float and a current convertor and by employing gravity as a return force;
2. Convertor types in which the moved water mass and the thus moved air masses above are used to drive a wind turbine;
3. Convertor types which use the moved water masses for driving a water turbine.

For converting the mechanical energy into electrical energy, in addition to the known generator types it is also possible to use piezoresistive current convertors.

Devices for using the wave energy of the ocean, depending on their technical design, are dependent on the direction of the waves. The direction of the waves correlates with the wind direction so that wave energy devices are therefore adjusted according to the direction of the wind in order to improve efficiency. However, in practice this is very difficult because the devices have a size of a few hundred meters and a required water displacement of a few 10,000 to 100,000 tons, this resulting in great inertia. Not all embodiments can therefore be moveable according to the wind direction. Pilot plants have been built in the North Sea which is, in general, considered a very turbulent ocean, before the coast of Great Britain.

The surface of the earth is covered to approximately 70% ocean. Ocean waters therefore provide the largest continuous solar collector that can be provided on earth. In the vicinity of the equator, a sufficient thermal energy is stored within the surface water of the ocean so that between it and the cold ocean bottom waters a thermal dynamic cycle process can be operated. In Lexikon für Energietechnik-VDI Verlag, 1994, ocean thermal energy conversion (OTEC) power plants are disclosed. With an extrapolation of the mentioned examples the respective power plants have a water displacement of a few 10,000 tons. The respective dimensions can be within the range of a few 100 meters. Heat exchange of the thermal energy of the surface water at approximately 20° and the cold ocean bottom water of approximately 5° C. coming from a depth of 500 to 1,000 meters is carried out. An estimate can be provided by calculation based on the Carnot cycle and leads to an estimated efficiency of approximately 3%.

For producing electricity from the thermal energy stored within the ocean two technical thermodynamic processes are available in addition to the thermoelectric effect. See Renewable Energy from The Ocean, A Guide to OTEC, W. H. Avery, C. WU, 1994. The technically open cycle process removes from the ocean directly, without intermediate use of further cycle processes with easily vaporizable working means, the thermal energy and supplies it to a turbine generator set. In a technically closed cycle process an intermediate cycle process, for example, by using ammonia, removes the energy and guides it to a turbine with a generator. In addition to these two basic types, there are also mixed embodiments in the technical realization of open and closed cycle processes.

Furthermore, OTEC devices are known, (see Energielexikon, Meyer-Verlag), which condense salt-free water vapor in a condenser and thus provide raw water for desalination potable water production.

Ocean water decellanation is of special importance in the connection with regenerative energies. Since water is the basic ingredient of a hydrogen economy, large amounts of free water are required for producing hydrogen and oxygen. Hydrogen is an ideal storage medium for regenerative energy because it has a high degree of efficiency when converted into any other energy form. For conversion it is possible to use fuel cells which directly produce electrical current from hydrogen and oxygen. Furthermore, the waste energy of such cells can be used for covering heating requirements ("Einsatz von Brennstoffzellen" vom, OTTI-Technologie-Kolleg, Ostbayerisches Technologie Transfer Institute e. V. Regensburg, 1994). Also, fresh water in the near future may become a very important foodstuff and thus maybe one of the most valued commodities of humankind. The world reserves of potable water or fresh water are being reduced at an incredible rate. Fossil fuel-operated power plants require a great amount of water in two ways. On the one hand, great amounts of river water are evaporated by cooling towers and the rivers are thus unnecessarily loaded with thermal energy. Nuclear power plants around rivers also contribute to heating the rivers. Furthermore, large amounts of ground water are pumped from their reservoirs for the purpose of mining brown coal. Some of this water is older than 15,000 years. A further negative impact on water quality results from excessive ranching and farming endeavors which, to a great extent, contribute to pollution of fresh water. The sedimentations in the river beds which generally have a cleaning effect are loaded more and more with pollutants. It is much more difficult to provide the required amount of potable water in areas of population concentration. Deep wells have been plundered and the ground water level has been lowered steadily. In many locations all over the earth where humans are living water is already a scarce commodity. It must be transported by truck and then dispensed. Conflicts in regard to the foodstuff water increase world wide.

These arguments are provided to underscore the importance of sea water desalination in the future.

Desalination of sea water can be performed in different ways. In addition to the thermal desalination, such as distillation methods, the reserve osmosis method is becoming more and more important. Reverse osmosis devices require high pressures in order to reverse the concentration gradient between fresh water and salt water thus countering the osmotic pressure. Fresh water is thus essentially pressed out. In the context of these forces there are power plants which employ the osmotic pressure for energy generation. However, this means that large amount of fresh water and sea water (saltwater) must be provided at one location. However, since fresh water is a raw material that is very precious and at the same time is a foodstuff, this method should not be used.

The following concepts and methods for using regenerative energy are current state of the art.

From German Patent Document 36 22 285 a small power plant for simultaneous use of four natural forces in shallow ocean waters is known. The following forces cooperate:

The lifting force of the waves, the gravity acting on a float, the water current, and the kinetic energy of the wind acting on a rotary shaft. The rotary shaft drives a generator. This device can also be used in a group of more devices of the same kind. Lifting force, gravity, and water flow correspond to the three known types of wave-based power plants. The disclosed device employs the kinetic energy of the wind only in the resistance area in the vicinity of the water surface. However, the energy contained in this area is minimal because of the minimal wind speed so that this device is substantially operated by the force of the waves and the water flow.

In German Patent Document 36 27 130, a continuation-in-part application of Patent 36 22 285, a variant is disclosed which does not improve this aspect of wind energy use and which discloses the pressure of the wind only as an additional energy.

In German Patent Document 25 14 447, a wave and wind energy storage power plant is disclosed which drives by compressed air pumps for generating hydraulic potential energy for the purpose of turning water turbines for electricity generation.

From German Patent Document 43 39 824, a floating wind and wave energy power plant is known which is comprised of a sail rotor, designed similar to a Dutch windmill, and a wave paddle wheel. The energy is transmitted to a common rotating energy storage device. The rotating storage device cooperates with an electric generator in order to produce electric energy.

In German Patent Document 27 52 892, a wind and wave energy device in combination with a tidal power plant is disclosed for generating electricity. Combining different regenerative sources with the tidal energy is possible only at a few locations on this earth because this power plant type requires a tidal lift of at least 3 meters in order to operate properly. For the German North Sea coast an average tidal lift of 2.7 meters has been measured. Economical operation would seem possible only when used as an auxiliary energy to be fed into a common supply network.

From German Patent Document 195 02 953, a mechanical energy generator is known which, for example, suggest the combination of wind energy, water energy, solar energy and biomass energy. An energy storage device is disclosed which collects the different types of energies in the form of rotational energy and this energy is converted by a generator into electric current. This device can be used on land as well as on the ocean. In principle, it is possible to convert basically any type of energy into rotational energy. In order to be able to use this energy, the storage devices with their generators must be operated in the vicinity of the supply network in order to be able to supply the current to the consumer. When connection to a network is not possible, a chemical energy storage must be employed in order to allow transport of energy to the consumer. Furthermore, with rotating masses, which receive a corresponding amount of energy, a complicated service and maintenance system is required and friction will cause a certain amount of loss.

In German Patent Document 38 08 536, a wind-powered device is disclosed which produces fresh water from sea water according to the principle of reverse osmosis without requiring intermediate energy conversion into electric current. The wind energy is directly converted into the pressure required for reverse osmosis.

The following German documents DE 36 34 102, DE 33 32 810, DE 37 04 280, DE 36 22 119, DE 41 37 569, DE 25 20 044, and DE 43 10 843 disclose floating or stationarily secured devices which produce the required amount of electric current for hydrogen production only by wind energy or solar energy. Some of these floating devices can be operated while stationary as well as while being moved.

A method for using thermal and/or mechanical energy potentials, especially with minimal potential differences, is disclosed in German Patent 40 17 684. This reference mentions only that, when using the potential difference, electrical energy is first produced, at the production location, respectively, in its vicinity water is electrically cleaved into oxygen and hydrogen, the hydrogen is used for reducing metal or metal oxide, and the resulting metal hydride is employed where needed together with oxygen by releasing heat energy or is used in fuel cells for producing electrical energy.

This method does not explain in which manner and where the inventive method can be economically and ecologically effectively used.

In summarizing the above the problems when using regenerative energy can be classified as follows.

Due to the minimal energy density of regenerative energy sources relative to conventional fuels, energy convertors for solar radiation and kinetic energy of wind require large surface areas. Convertors for ocean thermal energy and wave energy require large and heavy devices in order circulate the required amount of water and to thus be able to produce in an economical manner electric current and heat energy.

The second problem is the inconsistent supply of energy at the location of energy production over time. For example, the energy cannot be provided in correlation to the consumer demand because the flow of energy occurs only with a statistical distribution and is not always available when requested by the consumer.

It is therefore an object of the present invention to provide a concept that, with a combination of different methods for energy production, provides a continuous energy flow of regenerative energy sources. The produced energy can be stored with universal energy storage devices but can also be directly employed in industrial production processes. This concept is advantageous in that the selected system technology can be used in an advantageous manner because the individual processes, can compliment one another or even dependant on one another, while their disadvantages are overcome, in order to thus provide an efficiency increase with respect to the individual devices.

SUMMARY OF THE INVENTION

As a solution to this object a system with a floating or an anchored support structure with a plurality of energy convertors for regenerative energy forms is suggested. In addition to the support structure, energy producing devices for producing a continuous supply of energy by at least two different methods from regenerative energy sources are provided, wherein the regenerative energy sources are ocean water, ocean waves, wind, and solar radiation. Further included is at least one industrial production facility and a submarine reverse osmosis device. In order to increase the concentration of energy production, support structures with their different processing facilities and energy producing devices are combined in group and are connected to a common supply net. Peripheral processing devices on separate individual supports can also be used together and can be optimally employed. A process control unit that controls the entire grouping of processing devices and energy producing devices provides for an optimized operation of all components of the maritime power plant system.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 1:
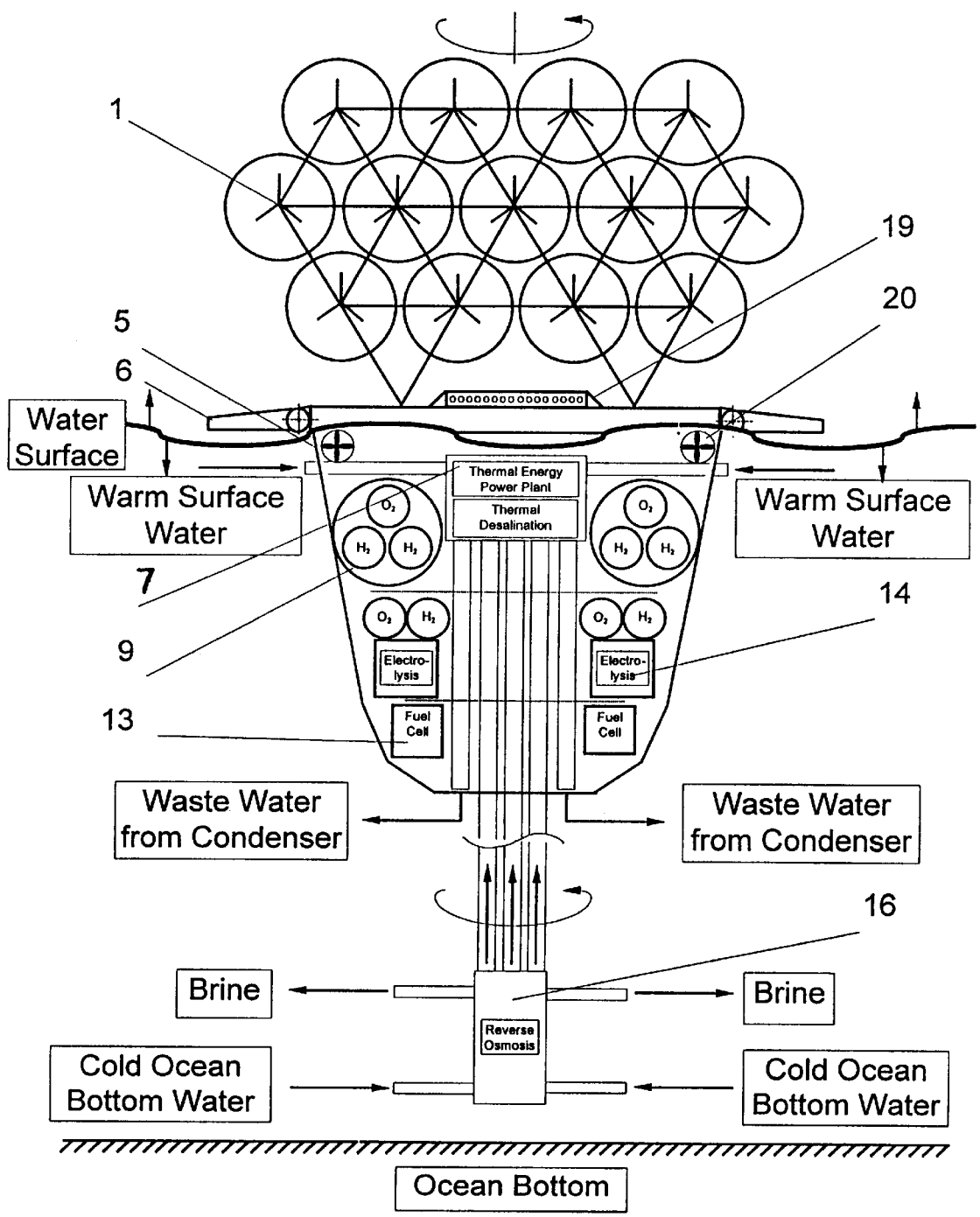
FIG. 1 shows a floating support structure with wind energy convertor according to the multi rotor concept, a thermal desalination device, a wave energy power plant for electric current generation, a electrolysis device as a hydrogen producer, fuel cells for supplying electricity and heat energy to the onboard system, desalination devices based on reverse osmosis, liquifaction and storage devices for hydrogen and oxygen, a drive system for orienting the support structure according to the wind direction and for transporting the power plant system, and a computer center with rooms for the operating personnel.
Figure 2:
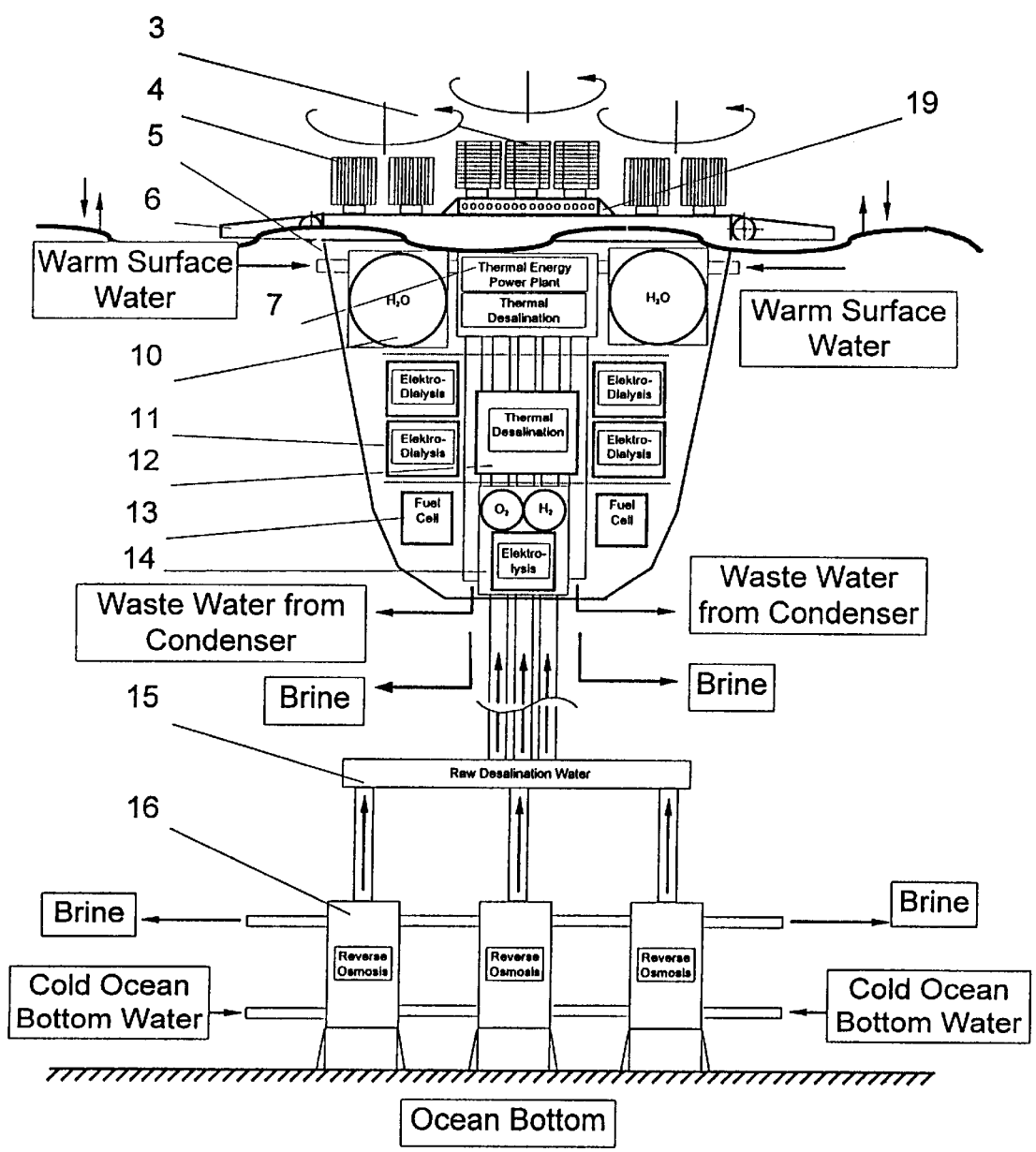
FIG. 2 a floating support structure with photovoltaic tag devices and solar collectors, a thermal energy power plant with thermal desalination device, a further thermal desalination device as a separate process, desalination devices according to the principle of reverse osmosis, desalination with electrolysis, wherein the electric current of the solar cells and of the wave power plant is used for fresh water production, brine and waste water going to a common outlet pipeline, electrolysis devices for hydrogen production with liquifaction and storage devices, fuel cells for safe supply of the onboard system with electricity and heat energy and the computer center with rooms for the operating personnel.
Figure 3:
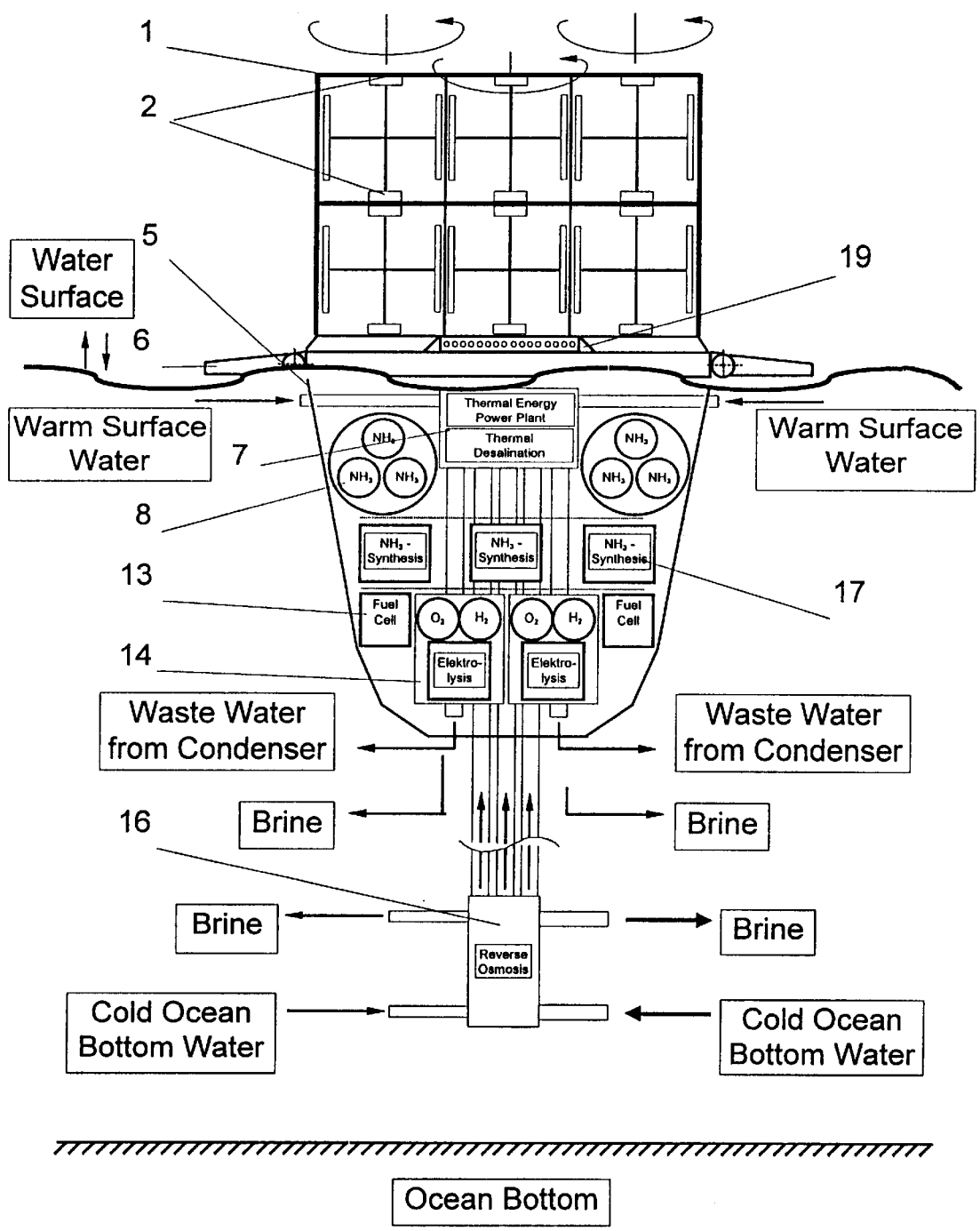
FIG. 3 shows a floating support structure with wind energy convertors and generators, a thermal energy power plant with thermal desalination device, a wave power plant for current production, electrolysis devices for hydrogen and oxygen production, fuel cells for a safe supply of the onboard system with electricity and heat energy, desalination devices operating according to the reverse osmosis system, ammonia synthesis device with storage tank.
Figure 4:
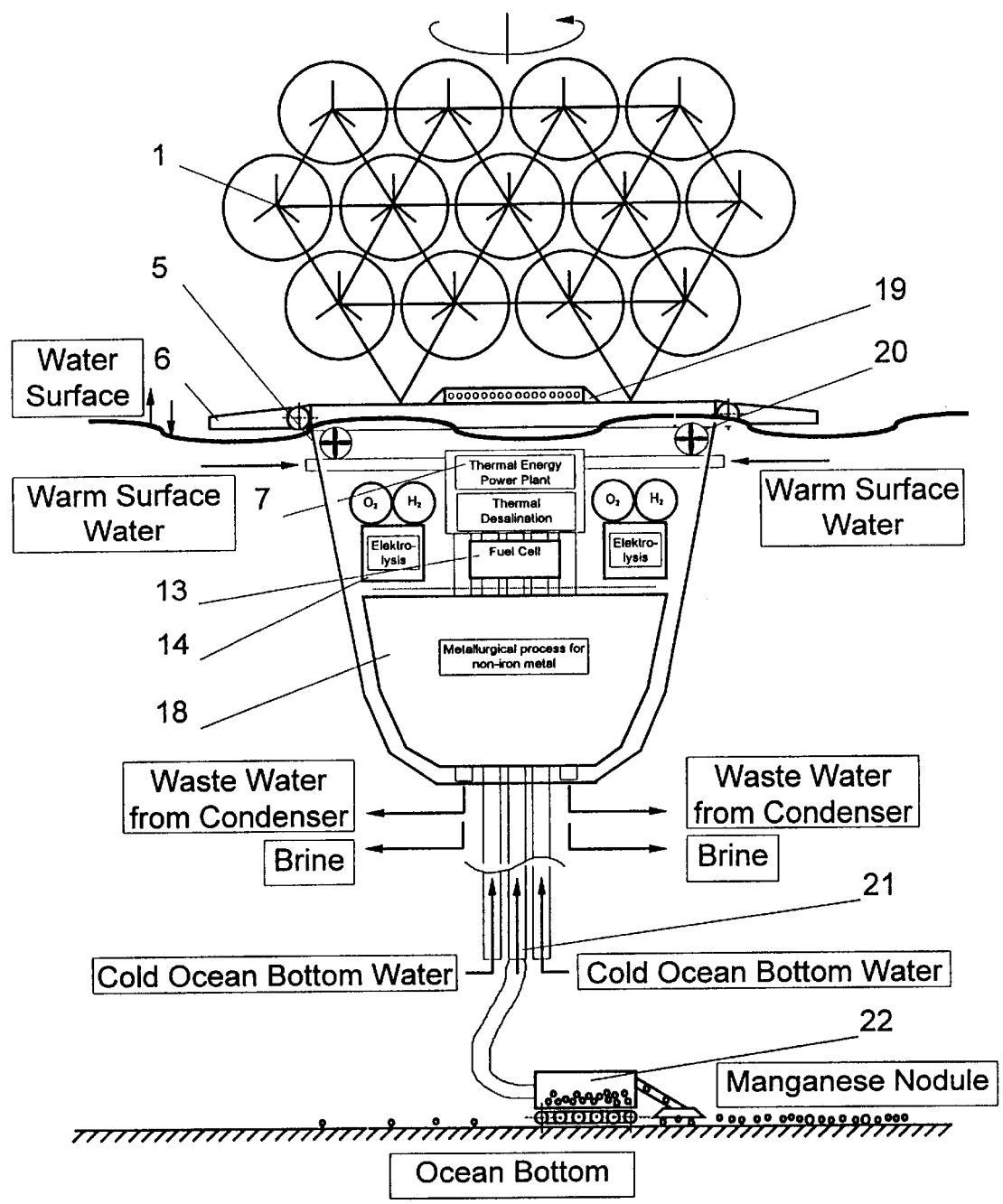
FIG. 4 a floating support structure with wind energy convertor, a thermal heat power plant used in connection with thermal desalination, a wave power plant for generating electricity, electrolysis devices as a hydrogen producer, fuel cells for safely supplying the onboard system with electricity and heat energy, a metallurgical processing device for producing non-iron metals in connection with ore mining production at the ocean bottom with supply device, a drive device for orienting the support structure according to the wind direction and for moving and transporting the system, as well as a computer center with rooms for the operating personnel.
Figure 5:
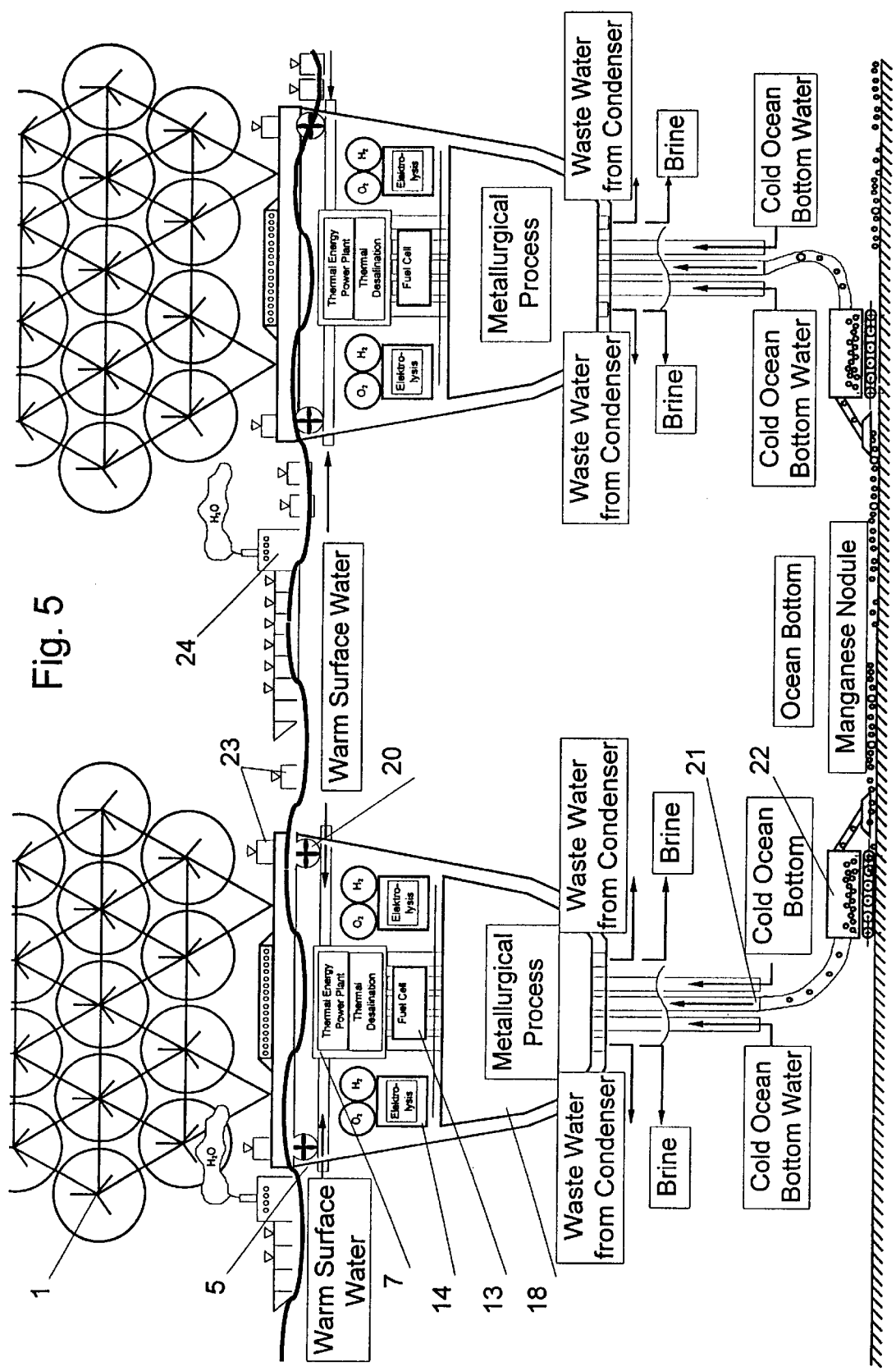
FIG. 5 two cooperating support structures with wind energy convertors in combination with a thermal heat power plant and thermal desalination device, electrolysis devices as hydrogen producers, fuel cells and a metallurgical processing device for producing, for example, non-iron metals in connection with ore mining at the ocean floor, individual transport modules which can be combined to a train.

The present invention will now be described in detail with the aid of several specific embodiments utilizing FIGS. 1 through 5.

The following combinations are possible.

Wind energy convertors 1 according to the multi rotor concept are positioned on a platform positioned above the surface of the ocean. Wave energy convertors 6 are provided also. Below the water surface individual processing devices are installed on different planes of the support structure 5. For example, a heat exchanging device 7 for heat energy recovery from the thermal energy of the ocean is provided, whereby the corresponding pipelines are guided through the entire support structure 5 to the bottom of the device through a mine shaft-like structure. Other intermediate floors are provided with electrolysis devices 14, storage devices 8, and, for example, an ammonia producing device 17. The storage tanks 8 are positioned at the level of the water surface and can thus also be used as flotation bodies.

The fresh water production is realized at the ocean bottom by reverse osmosis device 16. In an investigation of submarine reverse osmosis devices (see Entwicklung, Simulation, Bau und Erprobung einer submarinen Anlage zur Meerwasserentsalzung nach dem Prinzip der Umkehrosmose, Thomas Peters, Universität Erlangen-Nürnberg, 1980) the pressure of the water column for fresh water production in a system of approximately 1,000 meter depth has been used. The desalinated water is pumped to the surface and treated to be used as drinking water. The energy balance of this method is economical in comparison to other desalination methods.

The cold water to be desalinated by the submarine reverse osmosis device 16 as well as the cooling water for heat energy production from the thermal energy from the ocean 7 is pumped from great depth, so that a combination of these two devices is possible.

An especially great energy potential on the ocean is the kinetic energy of the wind. For example, a number of variants of wind convertors will be disclosed in the following.

A floating support structure 5 with wind energy convertors 1 according to the multi rotor concept with mantle turbines can be provided with are positioned vertical for a fast wind direction change. In general, concentrator systems lead to smaller rotors and reduce the mass of rotating parts.

The great masses of the support structure 5 under the water surface provide a counter weight for the moment that results from wind pressure onto the rotors and its support 1. Similar to the keel of a sail boat, these masses prevent slanting and, when a suitable design of the underwater portion of the platform is selected, a drifting of the platform is made more difficult. In addition, a connection to a submarine reverse osmosis device 16 for ocean water desalination at the ocean bottom may be necessary so that the entire arrangement is anchored like a giant buoy at the bottom of the ocean.

In order to be able to provide for an adjustment to the wind direction, the pipelines extending to and from the reverse osmosis device 16 are rotatable. Connections in parallel thereto must be provided which can receive the forces of such support structures and which do not load the pipelines. It is also possible to drag the reverse osmosis device 16 like a drag anchor. This eliminates the rotatable pipeline connections since the submarine device parts will rotate above the ocean bottom.

It may be especially advantageous when the support structure 5 has its own drive 20, or, in the alternative, is towed by tug boats.

In order not to affect the device for adjusting the position according to the wind direction during loading of a transport ship by dragging the ship, individual transport modules 23 are suggested which, after being filled, leave the support structure 5 and are then combined to a transport train 24. This allows for return to harbor by a modular train.

In order to provide for more movability, the support structure 5 can be provided with an anchoring system to be lowered or lifted as desired. It is also possible to include the desalination device into this anchoring system so that a fast positional change of the entire power plant system is possible in order to be able to avoid an approaching storm front.

Buoy systems surrounding the device at a spacing are provided with wind direction indicators and wind speed measuring sensors in order to position the wind power plant for optimal energy generation according to the wind direction or in order to provide at an early point in time information in regard to initiating measures for weather proofing the power plant. Radio transmission can be used for exchanging information between all components of the power plant system and to connect all elements to a common control unit (computer center). This control unit, which should be embodied with redundancy, will exchange positional data for collision avoidance as well as process data for an optimal operation of the entire power plant system. The auto positioning of the individual devices can also be provided by a global positioning system via satellite. The collision avoidance system also relates to ocean going ships passing though the area.

As a further variant, in warm and sunny regions of the earth photovoltaic devices 3 for electric current generation are provided on the surface of the platform. As an alternative, or in combination, solar collectors 4 or other solar thermal convertor systems with concentrators such as parabolic mirrors for heat generation can be installed. This recovered heat in a middle temperature range is then transformed by a turbine generator set into electrical current. In connection with the thermal energy production 7 from the ocean a coupling to a low temperature range for current generation or desalination is also possible.

In order to be able to produce large amounts of potable water, along the coastal areas of Africa combinations of different desalination processes can be concentrated on a support structure 5. For employing the thermal energy of the ocean distillation methods (12) can be used. With the electric current, for example, derived from the kinetic wind energy, an electrical dialysis device 11 is employed and the reverse osmosis devices 16 at the bottom of the ocean also contribute to the production of potable water. This allows for example, to provide areas of population concentration with sufficient amounts of potable water or to carry out irrigation projects.

The following scenarios with different manufacturing processes performed in industrial production facilities are possible.

Electrical current, heat and hydrogen can also be used on site for the manufacture of different products in various industrial production facilities. The manufacture of a product in the sense of a cumulative energy consumption is also to be considered as a storage of the gained energy. Such an industrial production process or facility could be the alkaline electrolysis of sea water for producing sodium hydroxide. Hydrogen could be employed in ammonia synthesis 17. Also, methanol production is possible. The carbon required for methanol production could be derived from the ocean.

Ore nodules mined at the bottom of the ocean can also be further processed. For example, the energy producer, here the entire support structure 5, is entrained with other processing devices or the energy producer operates stationarily and the ore mining vessels 22 will return from the mining location to the energy producer having integrated therein the metallurgical production process 18.

In order to provide a continuous supply of electricity for the electric current-intensive manufacturing processes, fuel cells 13, for example, operated with hydrogen, can compensate fluctuations in the wind and wave energy. The fuel cells 13 also supply the process control (computer) center to ensure operational safety. Fuel cells 13 which can be embodied as a block heating plant, can also increase the efficiency of the system in order to provide sufficient heat output. When fuel cells 13 with great output are used, for example, in the MW (megawatt) range, the excess heat can also be used as processing heat. Diesel generator systems are then no longer needed.

Due to the large water masses which must be circulated for thermal energy conversion (OTEC) and for kinetic energy conversion of the waves as well as for the high throughput for reverse osmosis, it is possible to filter out pollutants with filter devices in addition to plankton and algae. Thus, the device is protected in sensitive areas against pollution and soiling. The separated biological materials can then be used in fermentation tanks for producing bio gas.

In light-permeable growing tanks it is possible to increase the population of algae and plankton and to subsequently use them for further processing, for example, for protein production. Also, it is possible to operate a maritime foodstuff production, for example, by employing heating and cooling processes in order to provide optimal conditions for growing food fishes.

As the algae coating reduces the energy flow for thermal heat generation from the ocean, corrosion processes reduce transfer during heat conduction. For example, electric current-consuming methods for corrosion prevention can be used. This reduces the down times for exchanging components during maintenance and increases the efficiency of the system.

In general, such a system allows for a decoupling of the consumer network on land and the non-continuous energy production on the ocean. The continuous transport of energy carriers and other products provides a quasi-continuous energy transport to the consumer. Fluctuations in supply and in energy consumption can be compensated by intermediate storage of -energy carriers and the storage of products.

In order to increase, in general, the efficiency of a regenerative energy convertor, it is expedient to combine it with convertors of other energy forms. For example, the available space can be better used and the components of the convertor can be used in multiple ways. For example, a low temperature process with turbine and generator can be supplied by a plurality of heat sources such as thermal energy of the ocean and solar energy. Via the conversion into electric current, different energy convertors together may provide sufficient electricity for electrolysis or other processes, and the corresponding auxiliary devices and storage devices can be used more efficiently. At least two regenerative energy forms should be used in the inventive power plant system for producing energy. If possible, all regenerative energy sources available at a location should be used. In order to avoid transmission losses, suitable production processes are coupled with energy producing processes or are at least operated in close vicinity. Such a concentration of the different convertor methods in combination with manufacturing processes then allows for an economic and optimized operation in comparison to an individual device with a single convertor method.

The use of a plurality of regenerative energy sources at a location has a another advantage. The discontinuous energy supply of one energy form can be compensated by other energy forms when a low supply is present.

For example, wind and wave energy are two correlated energy forms. However, there are wave shapes and movements which are independent of the momentary wind current so that at this moment electric current can still be produced. When employing OTEC, a substantially continuous energy flow over the entire day is possible. After a strong storm, when colder water layers have mixed with the warm surface water layers, the reduction of the temperature gradient will reduce the energy flow, but will not completely seize at a suitable location and is only subject to seasonal fluctuations.

When two or more such power plants are operated and their energy output at different locations is supplied to a supply net, a continuous energy flow is ensured. The intermediate storage of hydrogen decouples the energy flow from the statistically distributed generation and consumption. The consumer, supplied on land by a supply network, only experiences the continuous flow of the energy carrier in the form of electric current or gas. The consumer is thus independent of local fluctuations of the regenerative energy supply.

A further positive economical aspect for operating such a combination system is the avoidance of costs which will result from the environmental impact of other energy producing methods. These costs should be taken into consideration in conventional devices of energy production but have been ignored in the past. Instead they will be a legacy to the community of all beings on the earth and to all future generations of humankind. Recycling problems in regard to waste products of the energy production of fossil or nuclear fuels and high consumption of potable water for technical purposes are completely eliminated with the inventive concept.

The inventive goal is to provide with power plants based on regenerative energy sources an optimal efficiency and to provide energy in the magnitude of the currently used nuclear or fossil power plants. The combination systems must be adapted to the climatic conditions at the location of use and adapted to the requirements and operational capital of the respective countries.

In order to be able to commence with construction of such devices, an initial output of 50 MW to 100 MW of electrical total output is suggested. A combination of 10 power plants results in an electric output of 1 GW. This corresponds to a conventional nuclear power plant. The required surface area on the ocean would be acceptable. Ecologically sensitive coastal areas such as the coastal areas of the North Sea or corral reefs can be avoided.

In a further development for achieving greater output for such power plants, greater masses with correspondingly enlarged support structures would be needed and directionally independent wind and wave energy convertors would be preferred. For example, platforms with multi rotors, for example, according to the Darius principle are possible. When using the Yen turbulence tower, magnitudes of 1 GW for a power plant can be achieved according to estimates. These devices have gigantic dimensions. Future developments having individual outputs of approximately 1 GW per power plant allow a group with a total output of 10 GW. When taking into consideration the reusability of materials, such devices, after approximately 25 years of operation, can be recycled for raw materials.

The total destruction of such power plants by natural catastrophes will not have any substantial impact on the environment so that no impact will be felt in future generations. The maximum credible accident (MCA) would be the complete destruction and sinking of such a device in the ocean. In order to avoid contamination of the environment, the processing devices are to be selected such that no catastrophic long term effects for the environment will be felt. The operational risks of such devices will be within the current frame of large industrial projects. With modern process control techniques and with experience derived from the power plant technology, such complex systems can be easily controlled. The risk of a "super" MCA as with nuclear power plants is not possible. There is no need for recycling of radioactive material, and there also is no need for a depository of contaminated material which must be isolated from the biosphere until the end of time. Since neither raw oil can be leaking nor a slow nuclear contamination of the oceans could occur and no $CO_2$ is produced, the suggested energy production system is advantageous in comparison to conventional concepts.

In addition to the slow worldwide nuclear contamination, the greenhouse effect is also one of the greatest ecological problems on earth. $CO_2$ as well as hydrogen belong to the group of greenhouse gases. Even for an energy economy based on hydrogen the principles of natural cycles must be considered. For example, only such reservoirs may be emptied which can be filled continuously by natural flow. The oceans are such storage reservoirs which by the global climate are connected to the cycles on land. For an intensive use of hydrogen as an energy carrier of regenerative energy forms, the material balance remains globally substantially in equilibrium. Whether such massive additional water vapor generation could result in a climatic change must be estimated and examined. An initial consideration shows that vaporization of water over the entire surface area of the oceans would result in substantially more water vapor in the atmosphere than any combustion processes of the hydrogen-based energy economy would produce. This problem will then be minimal in comparison to the $CO_2$ problem of today. However, this should still be considered when a hydrogen based energy economy is to be introduced.

The inventive device which in a concentrated form uses regenerative energy will take energy only from the already present solar energy stream and will release this energy at a different location. In the total balance sheet the flow balance of energy will not be disrupted and the biosphere will no longer be impacted by the energy consumption of mankind.

The specification incorporates by reference the disclosure of German priority document 197 14 512.4 of Apr. 17, 1997.

The present invention is, of course, in no way restricted to the specific disclosure of the specification and drawings, but also encompasses any modifications within the scope of the appended claims.

What is claimed is:

1. A maritime power plant system for producing, storing and consuming regenerative energy; said system comprising:
    a support structure;
    energy producing devices for producing a continuous supply of energy by at least two different methods from regenerative energy sources, wherein said regenerative energy sources are ocean water, ocean waves, wind, and solar radiation;
    at least one industrial production facility;
    a submarine reverse osmosis device.

2. A system according to claim 1, wherein said support structure is a platform.

3. A system according to claim 2, further comprising a releasable and rotatable anchoring system for anchoring said platform to the ocean bottom.

4. A system according to claim 2, wherein said platform is transportable.

5. A system according to claim 4, wherein said platform has a drive for moving said system to a selected location.

6. A system according to claim 1, wherein one of said energy producing devices operates by an open thermodynamic cyclic process without an intermediate direct heat exchanging process for extracting heat energy from the ocean water.

7. A system according to claim 1, wherein one of said energy producing devices operates by a closed thermodynamic cyclic process and an intermediate indirect heat exchanging process employing ammonia for extracting heat energy from the ocean water.

8. A system according to claim 1, wherein a first, second and third one of said energy producing devices are provided for extracting heat energy from the ocean water, wherein said first device operates by an open thermodynamic cyclic process without an intermediate direct heat exchanging process, wherein said second device operates by a closed thermodynamic cyclic process and an intermediate indirect heat exchanging process employing ammonia, and wherein said third device operates by a combined open and closed thermodynamic cyclic process.

9. A system according to claim 1, wherein one of said energy producing devices has a buoy converter comprising a float with an electromechanical converter for extracting kinetic energy of the ocean waves, wherein said float is lifted by a lifting force of the ocean waves and the lifting stroke of said float is transmitted onto said electromechanical converter and wherein gravity acts as a return force onto said float.

10. A system according to claim 1, wherein one of said energy producing devices has a wind turbine for extracting kinesic energy of the ocean waves, wherein said wind turbine is driven by air mass movement created above the ocean waves.

11. A system according to claim 1, wherein one of said energy producing devices has a water turbine for extracting kinetic energy of the ocean waves, wherein the water masses of the ocean waves drive said water turbine.

12. A system according to claim 1, wherein one of said energy producing devices comprises a rotor for extracting kinetic wind energy.

13. A system according to claim 1, wherein one of said energy producing devices comprises photovoltaic cells for converting solar radiation into electric energy.

14. A system according to claim 1, wherein one of said energy producing devices comprises a solar collector for collecting solar thermal energy.

15. A system according to claim 1, further comprising energy storage device for storing the energy produced by said energy producing devices.

16. A system according to claim 1, further comprising:
an electrolysis device for producing hydrogen and oxygen; and
storage devices for gaseous or liquid hydrogen and oxygen.

17. A system according to claim 1, further comprising fuel cells for producing electricity and heat.

18. A system according to claim 1, further comprising a releasable and rotatable anchoring system for anchoring said platform to the ocean bottom, wherein said reverse osmosis device is mounted within said anchoring system.

19. A system according to claim 18, wherein the cold ocean bottom water desalinated by said reverse osmosis device is used for cooling purposes.

20. A system according to claim 1, further comprising a thermal desalination device.

21. A system according to claim 1, wherein said thermal desalination device is used in combination with a first one of said energy producing devices, wherein said first device operates by heat exchange for extracting heat energy from the ocean water.

22. A system according to claim 1, further comprising an electro dialysis desalination device.

23. A system according to claim 1, wherein said industrial production facility is a methane gas producing device.

24. A system according to claim 23, wherein said methane producing device is used in combination with a first one of said energy producing devices, wherein said first device operates by heat exchange for extracting heat energy from the ocean water.

25. A system according to claim 1, wherein said industrial production facility has a maritime food stuff production facility comprising tanks that are air-permeable and light-permeable for growing plankton, algae and food fishes.

26. A system according to claim 25, wherein said industrial production facility includes a fermentation device in which plankton and algae are fermented.

27. A system according to claim 25, wherein said industrial production facility comprises a protein producing facility in which protein is produced from algae, plankton and food fishes.

28. A system according to claim 25, wherein a first one of said energy producing devices operates by heat exchange for extracting heat energy from the ocean water, wherein said first device is coupled to said maritime food stuff production facility.

29. A system according to claim 1, wherein said industrial production facility is an alkaline electrolysis device for producing sodium hydroxide.

30. A system according to claim 1, wherein said industrial production facility is an ammonia producing facility with a selectively actuated heat exchange device for removing the exothermic reaction energy.

31. A system according to claim 30, wherein a first one of said energy producing devices operates by heat exchange for extracting heat energy from the ocean water and is coupled to said ammonia producing facility.

32. A system according to claim 30, wherein a first one of said energy producing devices operates by heat exchange for extracting heat energy from the ocean water and is coupled to said selectively actuated heat exchange device.

33. A system according to claim 1, wherein said industrial production facility is a methanol producing plant.

34. A system according to claim 1, wherein said industrial production facility is a metal producing plant.

35. A system according to claim 34, wherein said metal producing plant includes a reducing stage employing hydrogen for producing non-iron metals or iron.

36. A system according to claim 1, comprising storage and transport units for the goods produced in said industrial production facility, wherein said storage and transport units are floating modules having a drive, wherein said modules are combinable to a large floating transport system.

37. A system according to claim 1, further comprising a control unit for controlling all of said energy producing devices, all of said industrial production facilities and said reverse osmosis device.

38. A system according to claim 37, comprising a plurality of power stations having said energy producing devices positioned thereon and comprising radio transmission devices, wherein said power stations exchange information with said control unit by radio transmission.

39. A system according to claim 37, comprising auxiliary devices for optimizing operation of said system, wherein said auxiliary devices are located at a periphery of said system and are connected for information exchange to said control unit.

40. A system according to claim 37, further comprising a global positioning system for auto-positioning said system and said auxiliary devices.

41. A system according to claim 1, further comprising a collision avoidance device for preventing collision between said system, said auxiliary devices and ocean-going ships.

42. A system according to claim 1, further comprising a weather protection system and a buoy system, wherein said buoy system measures wind speed and wind direction and in conjunction with weather satellites serves to adjust a position of said support structure and to enable a weather protection system of said system.

* * * * *